(12) United States Patent
Ye et al.

(10) Patent No.: US 12,064,050 B2
(45) Date of Patent: Aug. 20, 2024

(54) BEVERAGE CAPSULE, BREWING DEVICE, AND BEVERAGE DISPENSER

(71) Applicant: GUANGDONG MIDEA CONSUMER ELECTRIC MANUFACTURING CO., LTD., Foshan (CN)

(72) Inventors: Guoyong Ye, Foshan (CN); Guojun Zhu, Foshan (CN)

(73) Assignee: Guangdong Midea Consumer Electric Manufacturing Co., Ltd., Foshan (CN)

( * ) Notice: Subject to any disclaimer, the term of this patent is extended or adjusted under 35 U.S.C. 154(b) by 749 days.

(21) Appl. No.: 16/822,016

(22) Filed: Mar. 18, 2020

(65) Prior Publication Data
US 2020/0383515 A1    Dec. 10, 2020

(30) Foreign Application Priority Data

Jun. 4, 2019  (CN) .......................... 201910482726.6
Jun. 4, 2019  (CN) .......................... 201910482728.5

(51) Int. Cl.
*A47J 31/36*  (2006.01)
*B65D 85/804*  (2006.01)

(52) U.S. Cl.
CPC ...... *A47J 31/3633* (2013.01); *B65D 85/8043* (2013.01)

(58) Field of Classification Search
CPC ................ A47J 31/3633; A47J 31/3604; A47J 31/3623; A47J 31/408; A47J 31/3647; A47J 31/3652; A47J 31/0673; A47J 31/3628; A47J 31/407; B65D 85/8043; B65D 85/8046; B65D 85/8049; B65D 85/8052; B65D 85/8061; B65D 85/8064; B65B 29/02–025; B65B 61/007–02; B65B 61/18–184; B65B 61/28
USPC ..................................................... 99/295, 323
See application file for complete search history.

(56) References Cited

U.S. PATENT DOCUMENTS

| | | | |
|---|---|---|---|
| 2013/0276635 A1* | 10/2013 | Favero .................. | A47J 31/407 99/283 |
| 2014/0141140 A1* | 5/2014 | Bugnano ................. | A47J 31/30 426/431 |
| 2016/0001903 A1 | 1/2016 | Bartoli et al. | |
| 2016/0051080 A1* | 2/2016 | Lo Faro .............. | A47J 31/3628 99/283 |
| 2017/0233178 A1* | 8/2017 | Lo Faro ................ | A47J 31/401 99/295 |

(Continued)

OTHER PUBLICATIONS

First OA of CN Application No. 201910482728.5.

*Primary Examiner* — Helena Kosanovic
*Assistant Examiner* — Bonita Khlok

(57) ABSTRACT

Embodiments provide a beverage capsule, a brewing device, and a beverage dispenser. The beverage capsule comprises an inner cup, an outer cup and a sealing film, and the top edge of the inner cup is provided with an inner cup outward flange, which fits with the top edge of the circumferential wall of the outer cup to form a ring surface seal, and has an outward extension part that extends to the outer side of the outer cup in the radial direction, and the sealing film seals the top opening of the inner cup. In such an arrangement, the beverage capsule can form a tear opening between the inner cup outward flange and the top edge of the circumferential wall of the outer cup by means of a film tearing mechanism acting in a tearing form.

20 Claims, 11 Drawing Sheets

(56) References Cited

U.S. PATENT DOCUMENTS

2018/0319582 A1\* 11/2018 Footz .................... B65B 29/022
2020/0121115 A1\* 4/2020 Oh .......................... A47J 31/46

\* cited by examiner

BEVERAGE CAPSULE, BREWING DEVICE, AND BEVERAGE DISPENSER

CROSS-REFERENCES TO RELATED APPLICATIONS

The present application claims for priority to the Chinese Patent Application No. 201910482726.6 filed on Jun. 4, 2019 and the Chinese Patent Application No. 201910482728.5 filed on Jun. 4, 2019, the entire content of which is incorporated here by reference.

FIELD

The present disclosure belongs to the field of home appliances, in particular to a beverage capsule, a brewing device, and a beverage dispenser.

BACKGROUND

Presently, capsule-type beverage dispensers are more and more favored by the consumers and become more and more popular because of its characteristics, such as simple operation, high safety and hygiene, and guaranteed beverage quality, etc. In one embodiment, a beverage capsule containing a beverage consumable (e.g., coffee, milk tea or tea) is loaded in the beverage dispenser, then liquid is injected into the beverage capsule to brew beverage, and finally the brewed beverage flows out of the beverage dispenser for the user to enjoy.

In an existing beverage capsule, usually a capsule beverage outlet is formed in the bottom wall of the beverage capsule by means of a bottom piercing needle fixed in the beverage dispenser. Thus, when the brewed beverage flows out of the capsule beverage outlet, some beverage adheres to the bottom piercing needle, and bacteria may grow in the residual beverage on the bottom piercing needle. Consequently, the bottom piercing needle may contaminate the beverage flow through the capsule beverage outlet at the next time, resulting in compromised user experience.

SUMMARY

One embodiment of the present disclosure is to provide a beverage capsule, a brewing device, and a beverage dispenser, which ensure the user to enjoy the beverage hygienically and safely, and provide better user experience.

Another embodiment of the present disclosure provides a beverage capsule, which comprise an inner cup, an outer cup and a sealing film, and the top edge of the inner cup is provided with an inner cup outward flange, which fits with the top edge of the circumferential wall of the outer cup to form a ring surface seal, and has an outward extension part that extends to the outer side of the outer cup in the radial direction, and the sealing film seals the top opening of the inner cup.

In one embodiment, the outward extension part comprises a bent portion that is located on the outer circumference and extends obliquely toward the bottom of the cup with respect to the plane where the top edge of the circumferential wall of the outer cup is located.

In one embodiment, the outer cup is provided with an outer cup outward flange or outer cup inward flange, and the bottom surface of the inner cup outward flange is connected with the top surface of the outer cup outward flange or the outer cup inward flange by thermal compression bonding or ultrasonic bonding.

In one embodiment, the inner cup outward flange located between the top edge of the circumferential wall of the outer cup and the circumferential wall of the inner cup is formed with a weakened structure arranged around the circumferential wall of the inner cup.

In one embodiment, the circumferential wall and/or bottom wall of the inner cup is provided with an inner cup filter hole in 0.2 mm-1.5 mm diameter; and/or 5 mm-20 mm axial clearance is formed between the bottom wall of the inner cup and the bottom wall of the outer cup.

In one embodiment, the top portion of the inner cavity of the inner cup is provided with a top splitter, which is formed with a plurality of top through-flow holes in diameter not smaller than 0.2 mm and not greater than 1.0 mm.

In one embodiment of the present disclosure provides a brewing device, which comprises:

A capsule support provided with a capsule fixing mechanism for fixing the above-mentioned beverage capsule;

A capsule platen fixedly connected to the capsule support and provided with a liquid supply piercing needle for piercing into the beverage capsule;

A capsule pressing mechanism, which can move between an initial position and a pressing position, to press the beverage capsule to the capsule platen in the axial direction at the pressing position; and A film tearing mechanism arranged in a way that it can push the outward extension part of the beverage capsule in the axial direction along the beverage capsule and form a tear opening at the cup edge of the beverage capsule when the beverage capsule is fixed in the brewing device.

In one embodiment, the film tearing mechanism is arranged in a way that it is driven or triggered by the capsule pressing mechanism to move in the axial direction of the beverage capsule in the process of movement of the capsule pressing mechanism from the initial position to the pressing position, to push the outward extension part of the beverage capsule.

In one embodiment, the film tearing mechanism comprises a sliding rack slidably mounted on the capsule support and a return spring arranged in the axial direction of the beverage capsule, with two ends of the return spring connected with the capsule support and the sliding rack respectively, the sliding rack can be driven by the capsule pressing mechanism to overcome the resetting force of the return spring and move in the axial direction of the beverage capsule, to push the outward extension part of the beverage capsule.

In one embodiment, run-through slide channels extending in the axial direction of the beverage capsule are formed symmetrically on the side walls of the capsule support, the sliding rack has sliding shafts extending into the run-through slide channels and a pushing arm located at the bottom of the capsule support and connected between the sliding shafts, and the capsule pressing mechanism pushes the sliding shafts so that the pushing arm applies pushing force to the outward extension part of the beverage capsule.

In one embodiment, the pushing arm is formed with an abutting groove that abuts against the outward extension part and has an axial abutting surface and a radial stop surface connected with the axial abutting surface.

In one embodiment, the film tearing mechanism is arranged in a way that the pushing arm is driven to move over an abutting surface of the capsule platen that abuts against the beverage capsule in the process of movement of the capsule pressing mechanism from the initial position to the pressing position.

In one embodiment, the capsule pressing mechanism comprises a capsule supporting cup configured to press the beverage capsule on the capsule platen, the bottom of the capsule supporting cup in the cup opening area of the capsule supporting cup is formed with a clearance notch for the liquid in the beverage capsule to flow through, the capsule supporting cup is fitted with the beverage capsule and formed with slide blocks on two sides, and the capsule support is provided with slide rails that are fitted with the slide blocks to guide the capsule supporting cup to slide in the axial direction of the beverage capsule.

In one embodiment, the capsule pressing mechanism comprises a driving shaft pivotally mounted on the capsule support and a driving link rod and a driven link rod that are hinged between the driving shaft and the capsule supporting cup, to drive the capsule supporting cup to slide along the slide rails by driving the driving shaft to rotate.

In one embodiment, the capsule fixing mechanism comprises clamping members arranged symmetrically and clamping springs disposed between the clamping members and the capsule support, and the front end face and back end face of the clamping members in the axial direction of the beverage capsule are formed as bevel surfaces inclined with respect to the radial direction of the beverage capsule, so that the cup edge of the capsule supporting cup can overcome the spring force of the clamping springs to drive the clamping members in the radial direction by abutting against the bevel surfaces.

In one embodiment, the top portion of the capsule support is provided with a capsule window for loading the beverage capsule and a capsule inlet lid mounted slidably in the axial direction, the outer wall of the capsule supporting cup is provided with a push rod protruding outwards, and the capsule inlet lid can be pushed by the push rod to a position where it closes the capsule window in the process of movement of the capsule pressing mechanism from the initial position to the pressing position.

In one embodiment, the capsule support is provided with a capsule stop block configured to stop the beverage capsule from moving from the pressing position to the initial position together with the capsule supporting cup, the cup edge of the capsule supporting cup is formed with a stop block notch that permits the capsule stop block to pass through, so that the capsule supporting cup can be separated from the beverage capsule under the action of the capsule stop block when the capsule supporting cup moves from the pressing position to the initial position and the beverage capsule follows the capsule supporting cup in the movement.

In one embodiment, the bottom wall of the capsule support is formed with a capsule dropping opening, through which the beverage capsule separated from the capsule supporting cup can drop freely into a spent capsule receiving cavity of the beverage dispenser.

In one embodiment, an auxiliary tube for supplying hot water or steam is provided on the capsule support, and the outlet of the auxiliary tube is located below the capsule platen.

In another embodiment of the present disclosure provides a beverage dispenser, which comprises the above-mentioned brewing device.

In the present disclosure, after the beverage capsule is fixed inside the brewing device, a tear opening can be formed at the cup edge of the beverage capsule by pushing the outward extension part of the beverage capsule with the film tearing mechanism. Thus, Compared with a brewing device that utilizes a bottom piercing needle fixedly arranged in the brewing device to pierce the beverage capsule to form a capsule beverage outlet for the beverage to flow out, the brewing device in the embodiments of the present disclosure forms a tear opening at the cup edge of the capsule by means of a film tearing mechanism acting in a tearing form. Since the film tearing mechanism applies acting force only to the outward extension part, it doesn't contact directly with the beverage. Therefore, the film tearing mechanism will not contaminate the beverage brewed in the next time, the user is enabled to enjoy the brewed beverage hygienically and safely, and the user experience is improved.

BRIEF DESCRIPTION OF THE DRAWINGS

The accompanying drawings are provided here to facilitate further understanding on the present disclosure, and constitute a part of this document. They are used in conjunction with the following examples to explain the present disclosure, but shall not be comprehended as constituting any limitation to the present disclosure. In the figures:

FIG. 1 shows that the beverage capsule is fixed by means of a capsule fixing mechanism, and the beverage capsule doesn't belong to the brewing device;

FIG. 2 is a general sectional view of the capsule pressing mechanism in the pressing position;

FIG. 3 shows the capsule pressing mechanism in the initial position, and the beverage capsule is blocked by the capsule stop block, but the capsule inlet lid is not shown;

FIG. 4 is a general sectional view of the structure in FIG. 3, and 2 beverage capsules are shown to illustrate the free dropping tendency of the beverage capsule;

| Reference Numbers: | |
|---|---|
| 1 | Brewing device |
| 2 | Beverage capsule |
| 11 | Capsule support |
| 12 | Capsule platen |
| 13 | Capsule pressing mechanism |
| 14 | Film tearing mechanism |
| 15 | Micro-switch |
| 21 | Inner cup |
| 22 | Outer cup |
| 23 | Sealing film |
| 24 | Top splitter |
| 25 | Tear opening |
| 111 | Run-through slide channel |
| 112 | Slide rail |
| 113 | Clamping member |
| 114 | Capsule window |

-continued

| Reference Numbers: | |
|---|---|
| 116 | Capsule stop block |
| 118 | Auxiliary tube |
| 121 | Liquid supply piercing needle |
| 122 | Squeezing protrusion |
| 123 | Elastic seal ring |
| 124 | Identification probe |
| 131 | Capsule supporting cup |
| 132 | Slide block |
| 133 | Driving shaft |
| 134 | Driving link rod |
| 135 | Driven link rod |
| 136 | Second snap-fit element |
| 137 | Push rod |
| 138 | Handle |
| 141 | Sliding rack |
| 142 | Return spring |
| 211 | Inner cup outward flange |
| 212 | Inner cup filter hole |
| 221 | Outer cup outward flange |
| 241 | Top through-flow hole |
| 242 | Central recess portion |
| 1151 | Capsule inlet lid |
| 1152 | Inlet lid return spring |
| 1171 | Capsule dropping opening |
| 1172 | Through-flow opening |
| 1231 | Resilient protrusion |
| 131A | Clearance notch |
| 131B | Stop block notch |
| 1341 | First snap-fit element |
| 1411 | Sliding shaft |
| 1412 | Pushing arm |
| 2111 | Outward extension part |
| 2113 | Weakened structure |
| 1412A | Axial abutting surface |
| 1412B | Radial stop surface |
| 2111A | Bent portion |

DETAILED DESCRIPTION OF THE INVENTION

Hereunder some examples of the present disclosure will be detailed with reference to the accompanying drawings. It should be understood that the examples described here are only provided to describe and explain the present disclosure rather than constitute any limitation to the present disclosure.

It is noted that the examples and the features in the examples in the present disclosure can be combined freely, provided that there is no confliction among them.

In the present disclosure, unless otherwise specified, the words that denote directions or orientations, such as "above", "below", "top", and "bottom", etc., are usually used to describe the relative position relations among the components with respect to the direction shown in the accompanying drawings or the vertical, plumb, or gravity direction.

Hereunder the present disclosure will be detailed in examples with reference to the accompanying drawings.

Figure 1:
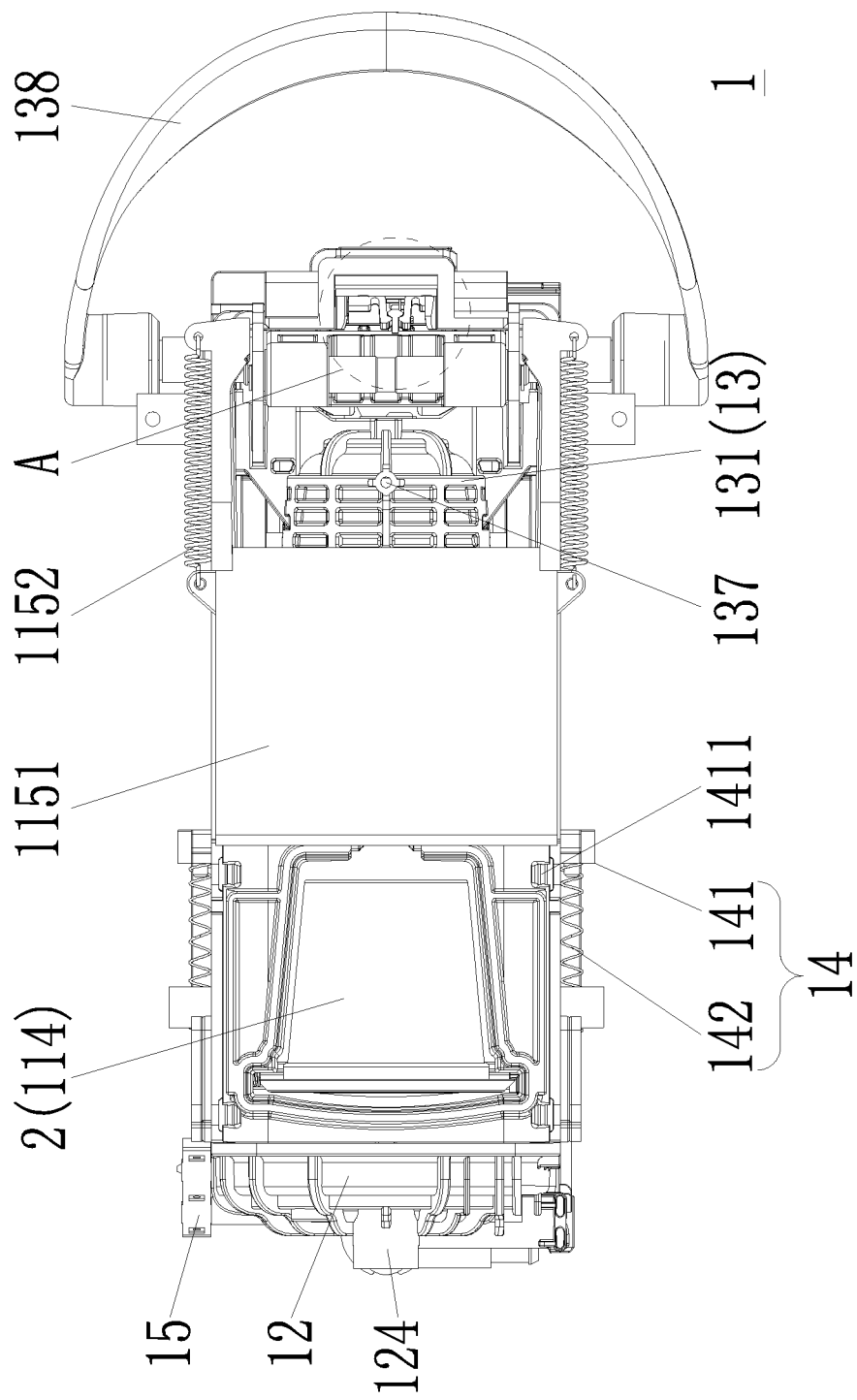
FIGS. 1-4 are top views of the brewing device according to some embodiments of the present disclosure.
Figure 2:
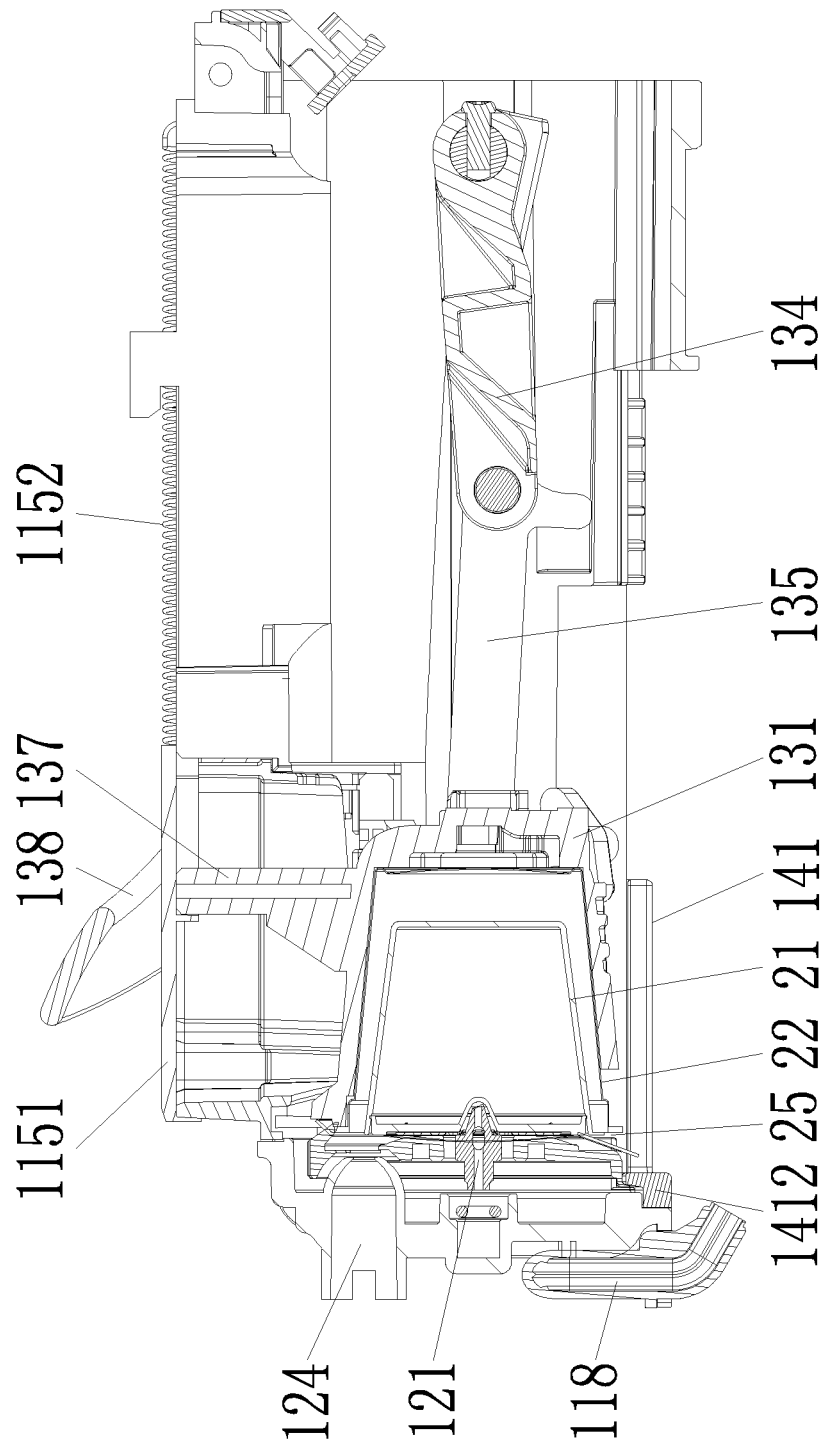
Figure 3:
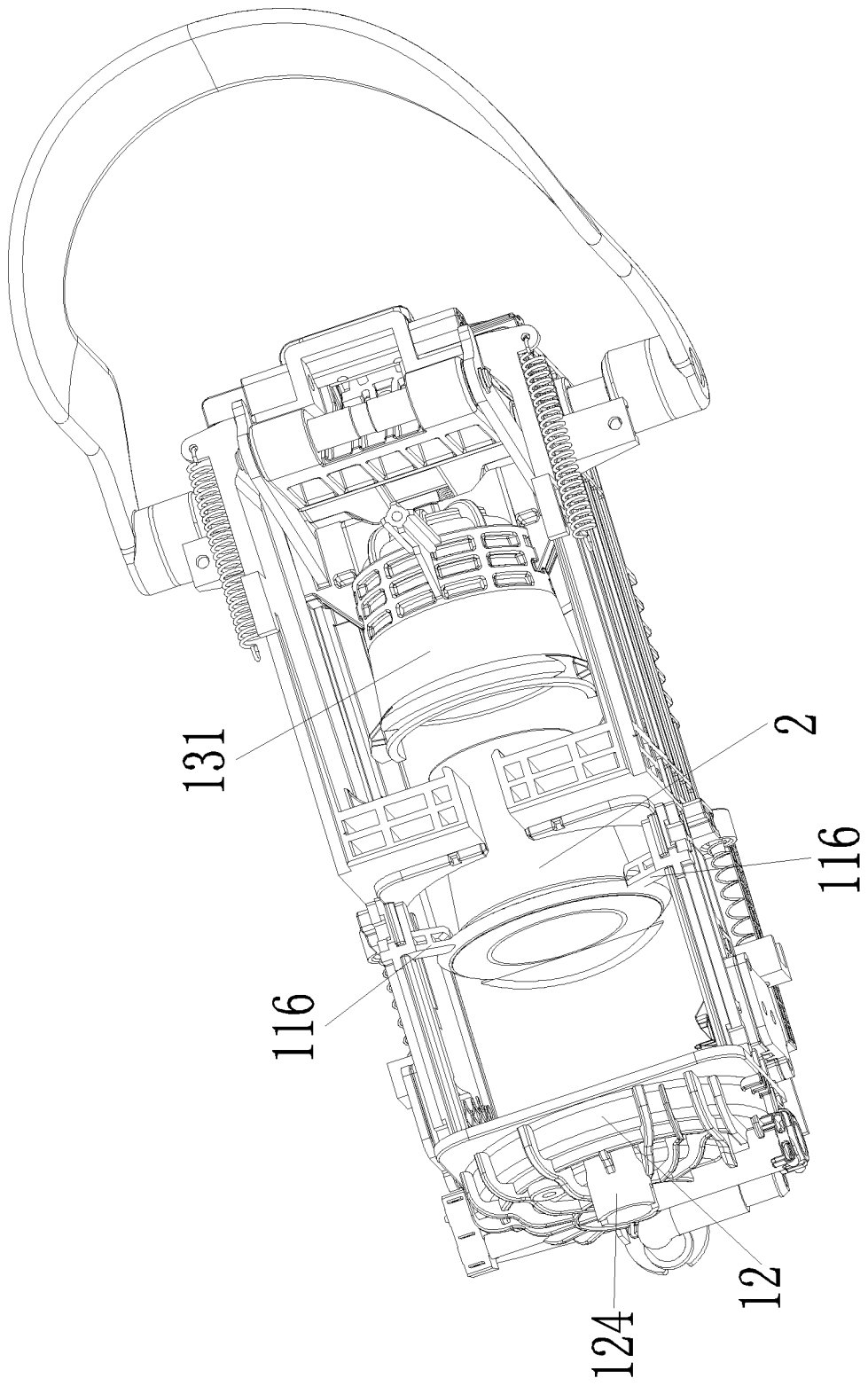

Firstly, the present disclosure provides a brewing device. As shown in FIGS. 1 and 2, the brewing device 1 comprises: a capsule support 11 provided with a capsule fixing mechanism for fixing a beverage capsule 2; a capsule platen 12 fixedly connected to the capsule support 11 and provided with a liquid supply piercing needle 121 for piercing into the beverage capsule 2; a capsule pressing mechanism 13, which can move between an initial position and a pressing position, to press the beverage capsule 2 on the capsule platen 12 in the axial direction at the pressing position; and a film tearing mechanism 14 arranged in a way that it can push an outward flange of the beverage capsule 2 in the axial direction along the beverage capsule 2 and form a tear opening 25 at the cup edge of the beverage capsule 2 when the beverage capsule 2 is fixed in the brewing device 1.

Accordingly, the present disclosure further provides a beverage dispenser, which comprises the brewing device 1. In one embodiment, the beverage dispenser comprises a liquid supply system configured to supply liquid into the beverage capsule 2 to brew beverage, and may further comprise an air supply system configured to blow air into the beverage capsule 2 after the beverage is brewed to blow out the residual liquid in the beverage capsule 2. Furthermore, the beverage dispenser comprises a brewing device mounting base, on which the brewing device 1 may be mounted fixedly or removably. In one embodiment, the beverage dispenser is a capsule-type beverage dispenser, such as capsule-type coffee machine, capsule-type soybean milk machine, or other capsule-type beverage dispenser that can brew a beverage capsule 2.

In the present disclosure, after a beverage capsule 2 is fixed in the brewing device 1, the film tearing mechanism 14 can push a capsule outward flange of the beverage capsule 2 in the axial direction of the beverage capsule 2, so that the film tearing mechanism 14 can form a tear opening 25 at the cup edge of the beverage capsule 2 by means of the axial pushing force applied to the capsule outward flange. Thus, compared with a traditional brewing device 1 that utilizes a bottom piercing needle fixedly arranged in the brewing device 1 to pierce the beverage capsule 2 to form a capsule beverage outlet for the beverage to flow out, the brewing device in the embodiments of the present disclosure inventively forms a tear opening 25 on the beverage capsule 2 for the beverage to flow out by means of a film tearing mechanism 14 acting in a tearing form. Since the film tearing mechanism 14 applies axial pushing force only to the capsule outward flange of the beverage capsule 2 without direct contact with the beverage, the beverage will not adhere to the film tearing mechanism 14. In that way, the film tearing mechanism 14 will not contaminate the beverage brewed in the next time when it tears the beverage capsule 2 in the next time, the user is enabled to enjoy the brewed beverage safely and hygienically, and the user experience can be improved greatly. Moreover, in a traditional brewing device 1, the residual beverage on the bottom piercing needle may give off unpleasant off-odor. In contrast, in some embodiments, by forming a tear opening 25 for the beverage to flow out in the top portion of the beverage capsule 2 by tearing, the brewing device 1 and the beverage dispenser won't give off unpleasant off-odor such as musty odor or stale odor, etc. In one embodiment, the beverage capsule 2 may be fixed in the brewing device 1 via the capsule fixing mechanism, or the beverage capsule 2 may be fixed in the brewing device 1 by pressing the beverage capsule 2 axially on the capsule platen 12 by means of the capsule pressing mechanism 13.

In addition, the brewing device 1 further comprises a capsule platen 12 and a capsule pressing mechanism 13, and the capsule platen 12 is fixedly connected to the capsule support 11 and provided with a liquid supply piercing needle 121 for piercing into the beverage capsule 2, the capsule pressing mechanism 13 can move between an initial position and a pressing position, and can press the beverage capsule 2 axially on the capsule platen 12 at the pressing position. In such an arrangement, by providing a pressing driving mechanism that drives the capsule pressing mechanism 13 to move between the initial position and the pressing position simply, the capsule platen 12 can press the sealing film 23 of the beverage capsule 2. Such a structure is simple and highly reliable.

Figure 11:
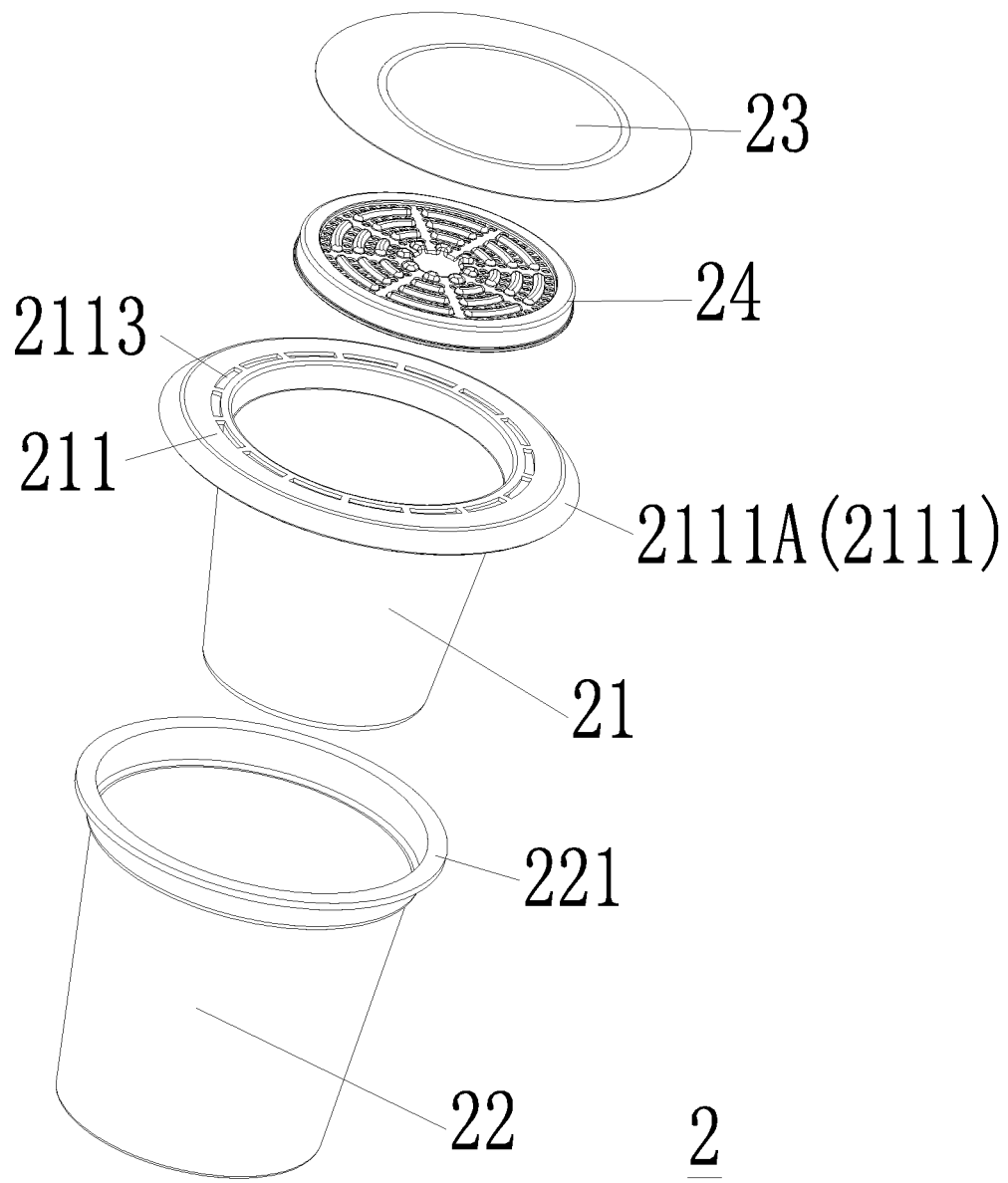
FIG. 11 is an exploded structural view of the beverage capsule according to embodiments of the present disclosure, and the beverage consumable is not shown.

The present disclosure further provides a beverage capsule 2. As shown in FIGS. 1 and 11, the beverage capsule 2 comprises an inner cup 21, an outer cup 22 and a sealing film 23, and the top edge of the inner cup 21 is provided with an inner cup outward flange 211, which fits with the top edge of the circumferential wall of the outer cup 22 to form a ring surface seal, and has an outward extension part 2111 that extends to the outer side of the outer cup 22 in the radial direction, and the sealing film 23 seals the top opening of the inner cup 21.

In addition, the present disclosure further provides a beverage dispenser, which comprises a capsule support 11 adapted to fix the beverage capsule 2 and a film tearing mechanism 14 that can partly separate the inner cup outward flange 211 from the top edge of the circumferential wall of the outer cup 22 to form a tear opening 25. In one embodiment, the beverage dispenser is a capsule-type beverage dispenser, such as capsule-type coffee machine, capsule-type soybean milk machine, or other capsule-type beverage dispenser that can brew a beverage capsule 2.

In the present disclosure, after a beverage capsule 2 is fixed in the beverage dispenser, the film tearing mechanism 14 can push an outward extension part 2111 of the beverage capsule 2 (i.e., the capsule outward flange of the beverage capsule 2) from the bottom of the beverage capsule 2 to the top of the beverage capsule 2 in the axial direction of the beverage capsule 2, so that the bottom surface of the inner cup outward flange 211 is separated at least partially from the top edge of the circumferential wall of the outer cup 22, i.e., the inner cup outward flange 211 of the inner cup 21 is torn open from the top edge of the circumferential wall of the outer cup 22, and a tear opening 25 for the beverage to flow out of the beverage capsule 2 is formed at the cup edge of the beverage capsule 2. In such an arrangement, compared with the prior art that utilizes a bottom piercing needle fixedly arranged in the beverage dispenser to pierce the beverage capsule 2 to form a capsule beverage outlet for the beverage to flow out, the beverage capsule 2 in some embodiments that can form a tear opening 25 between the inner cup outward flange 211 and the top edge of the circumferential wall of the outer cup 22 by means of a film tearing mechanism 14 acting in a tearing form. Since the component that forms the tear opening 25 (i.e., the film tearing mechanism 14) doesn't directly contact with the beverage, the beverage flowing out of the beverage capsule 2 will not be contaminated by the film tearing mechanism 14. Thus, the user can enjoy the brewed beverage safely and hygienically, and a better user experience is achieved. Moreover, since there is no residual beverage on the film tearing mechanism 14, the film tearing mechanism 14 won't give off unpleasant off-odor such as musty odor or stale odor owing to residual beverage, and the user experience can be improved. In one embodiment, the beverage capsule 2 may be fixed in the brewing device 1 via the capsule support 11, or the beverage capsule 2 may be fixed in the brewing device 1 by pressing the beverage capsule 2 axially on the capsule platen 12 by means of the capsule pressing mechanism 13, but the present disclosure is not limited to those fixing methods.

Figure 12:
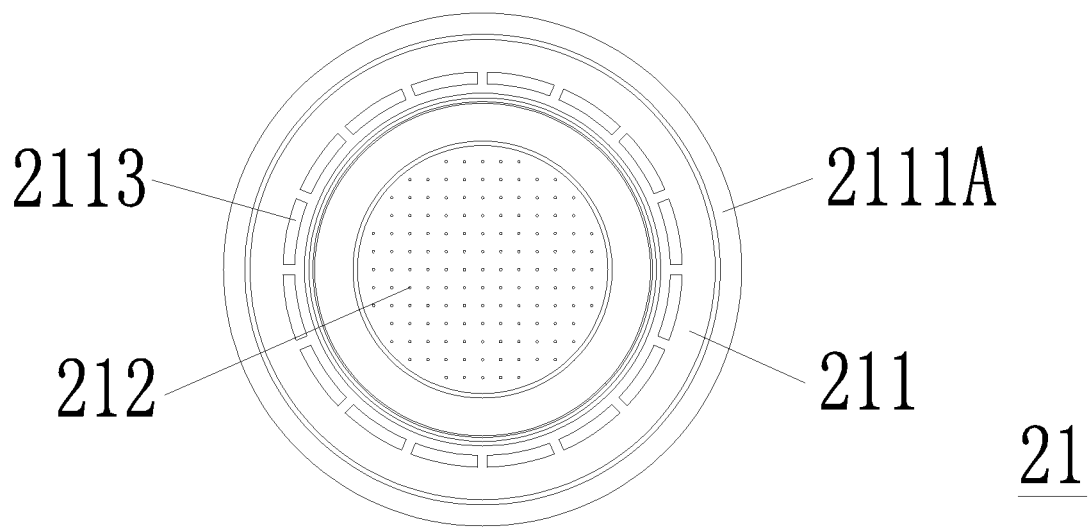
FIG. 12 is a top view of the inner cup in FIG. 11.
Figure 13:
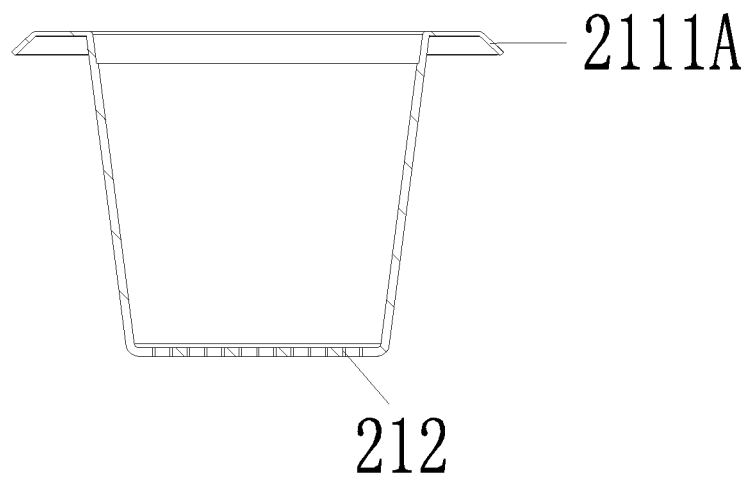
FIG. 13 is a sectional view of the inner cup in FIG. 11.

In one embodiment, as shown in FIGS. 11-13, the outward extension part 2111 comprises a bent portion 2111A that is located at the outer circumference and extends obliquely toward the cup bottom with respect to the plane where the top edge of the circumferential wall of the outer cup 22 is located. Thus, compared with one embodiment in which the entire outer edge portion is a structure that extends laterally outwards, in other embodiments, the outer circumference of the outward extension part 2111 is configured as a structure that extends obliquely toward the cup bottom with respect to the plane where the top edge of the circumferential wall of the outer cup 22 is located, so that the film tearing mechanism 14 can tear open the inner cup outward flange 211 more easily by axially pushing the bent portion 2111A. In one embodiment, the bent portion 2111A may extend downwards and outwards, or extend downwards and inwards, or extend downwards in the axial direction of the beverage capsule 2. Furthermore, the inner cup outward flange 211 should be arranged to extend horizontally outwards first and then extend obliquely downwards to form the bent portion 2111A. In such an arrangement, the sealing film 23 can be connected to the horizontally outward extending inner cup outward flange 211 by thermal compression bonding or ultrasonic bonding, etc.

To avoid inverted placement of the mold for producing the inner cup 21, as shown in FIGS. 11 and 13, the bent portion 2111A may be arranged to extend outwards in the radial direction or extend in the axial direction of the beverage capsule 2. In one embodiment, when the entire beverage capsule 2 is placed horizontally (i.e., the axis of the beverage capsule 2 is changed from a vertical state to a horizontal state), the beverage flowing downwards from the tear opening 25 tends to splash outwards in the axial direction. In view of that problem, the bent portion 2111A is arranged to extend outwards in the radial direction or extend in the axial direction of the beverage capsule 2, so that it attains a baffle effect, i.e., it can block the beverage from splashing outwards further in the axial direction. Thus, other parts of the beverage dispenser will not be contaminated by the beverage. Furthermore, to facilitate the film tearing mechanism 14 to tear open the inner cup outward flange 211 and achieve an aesthetic appearance of the beverage capsule 2, the horizontal included angle of the bent portion 2111A should not be smaller than 120° and not be greater than 150°.

Figure 8:
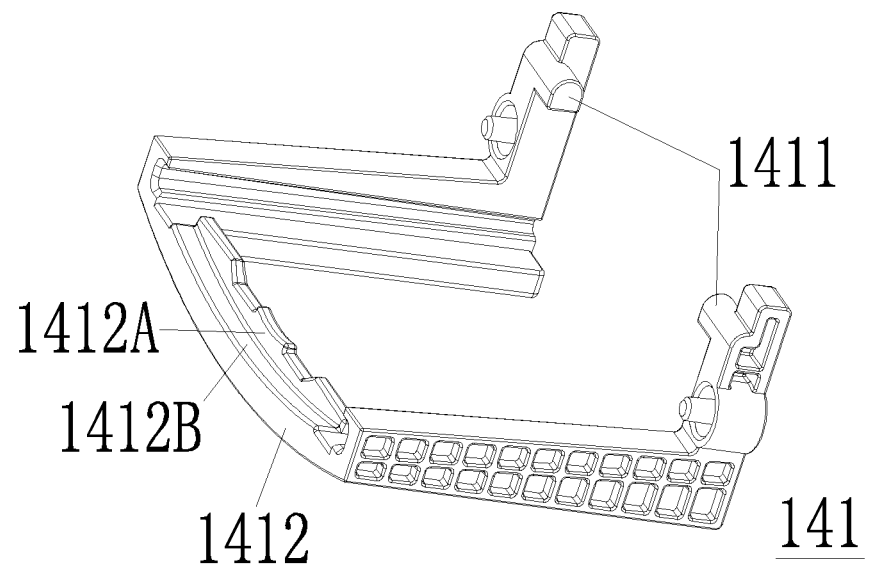
FIG. 8 is a schematic structural diagram of the sliding rack in FIG. 1.

In one embodiment, the film tearing mechanism 14 is provided with an abutting groove configured to abut against and push the outward extension part 2111, and the abutting groove is formed with an axial abutting surface 1412A connected and a radial stop surface 1412B. In addition, as shown in FIGS. 1, 2 and 8, to facilitate the film tearing mechanism 14 to tear open the inner cup outward flange 211, the axial abutting surface 1412A of the film tearing mechanism 14 should be arranged in a way that it just come into contact with the outward extension part 2111 of the inner cup outward flange 211 or just doesn't contact with the outward extension part 2111. Therefore, by configuring the axial projection of the outward extension part 2111 in the plane where the top edge of the circumferential wall of the outer cup 22 is located to have 2 mm-5 mm width in the radial direction, the outward extension part 2111 can be prevented from sliding out of the abutting groove, and the abutting groove has enough depth to tear open the inner cup outward flange 211. In one embodiment, the axial projection of the outward extension part 2111 in the plane where the top edge of the circumferential wall of the outer cup 22 is located has width not smaller than 2 mm and not greater than 3 mm in the radial direction.

To facilitate the film tearing mechanism 14 to separate the inner cup outward flange 211 from the top edge of the circumferential wall of the outer cup 22, as shown in FIGS. 1 and 11, the outer cup 22 is provided with an outer cup outward flange 221 or outer cup inward flange, and the bottom surface of the inner cup outward flange 211 is connected with the top surface of the outer cup outward flange 221 or outer cup inward flange, for example, by thermal compression bonding or ultrasonic bonding, but not limited to thermal compression bonding and ultrasonic bonding. In one embodiment, the inner cup outward flange 211 is connected with the outer cup outward flange 221 or outer cup inward flange to form a ring surface seal structure, so that the external atmosphere will not enter into the beverage capsule 2 through the clearance between the inner cup outward flange 211 and the outer cup outward flange 221 or outer cup inward flange, and the beverage capsule 2 is preserved in a fresh state.

In one embodiment, the circumferential wall of the inner cup 21 is located at the outer side of the circumferential wall of the outer cup 22 in the radial direction, the inner cup 21 is provided with an inner cup cavity for containing a beverage consumable (e.g., coffee, milk tea or tea, etc.), the top opening of the inner cup cavity (i.e., the top opening of the inner cup 21) is covered by a sealing film 23, the circumferential wall and/or bottom wall of the inner cup 21 is provided with an inner cup filter hole 212, and an through-flow cavity that communicates with the tear opening 25 and the inner cup filter hole 212 is formed between the cup wall of the inner cup 21 and the cup wall of the outer cup 22. In that way, after the liquid supply piercing needle 121 of the beverage dispenser pierces through the sealing film 23, beverage can be brewed in the inner cup cavity, and the brewed beverage can flow out of the beverage capsule 2 through the inner cup filter hole 212, the through-flow cavity, and the tear opening 25 sequentially.

To ensure that the inner cup 21 not only is adapted to contain extraction-type fine-grain beverage consumables but also is adapted to contain dissolution-type large-grain beverage consumables, i.e., the beverage consumable will not leak through the inner cup filter hole 212 into the through-flow cavity regardless of whether the beverage consumable is an extraction-type beverage consumable or an dissolution-type beverage consumable, as shown in FIGS. 11-13, the circumferential wall and/or bottom wall of the inner cup 21 is provided with an inner cup filter hole 212 in diameter not smaller than 0.2 mm and not greater than 1.5 mm.

In addition, to make the beverage capsule 2 applicable to a K-CUP capsule beverage dispenser, as shown in FIG. 2, 5 mm~20 mm axial clearance is formed between the bottom wall of the inner cup 21 and the bottom wall of the outer cup 22, to prevent the bottom wall piercing needle that pierces through the bottom wall of the outer cup 22 from piercing into the bottom wall of the inner cup 21. In one embodiment, a K-CUP capsule beverage dispenser is further provided with a bottom wall piercing needle configured to pierce through the bottom wall of the beverage capsule 2 to form an liquid outlet, besides the liquid supply piercing needle 121 configured to pierce through the sealing film 23 of the beverage capsule 2.

Figure 14:
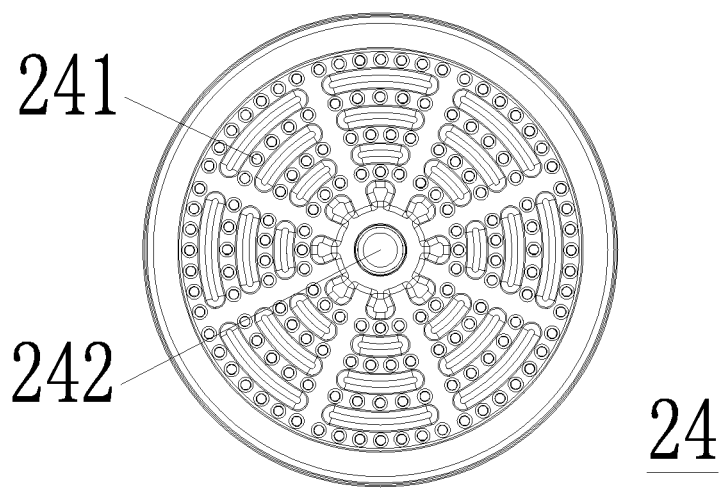
FIG. 14 is a top view of the top splitter in FIG. 11.

In one embodiment, as shown in FIGS. 2, 11 and 14, the top portion of the inner cavity of the inner cup 21 is provided with a top splitter 24 with a plurality of top through-flow holes 241. In that way, by adding a top splitter 24, an even flow splitting effect is attained. In some embodiments, for an extraction-type beverage capsule 2, the liquid can flow evenly and slowly through the plurality of top through-flow holes 241 in the top splitter 24 into the beverage consumable, and a better uniform extraction effect can be attained, and the brewed beverage has a mellow beverage taste. To ensure neither an extraction-type fine-grain beverage consumable nor a dissolution-type large-grain beverage consumable will not leak through the top through-flow hole 241, the diameter of the top through-flow hole 241 may not smaller than 0.2 mm and not greater than 1.5 mm. In one embodiment, if the diameter of the top through-flow hole 241 is too large, it will be adverse to the uniform flow of the liquid through the top through-flow hole 241 to the beverage consumable. Therefore, to enable the top through-flow hole 241 to achieve a good uniform flow splitting effect, the diameter of the top filter holes should not be greater than 1.0 mm. Of course, to attain a good brewing and dissolution effect for a dissolution-type beverage consumable, in another embodiment no top splitter 24 is provided in the dissolution-type beverage capsule 2. However, the present disclosure is not limited to those arrangements.

Figure 15:
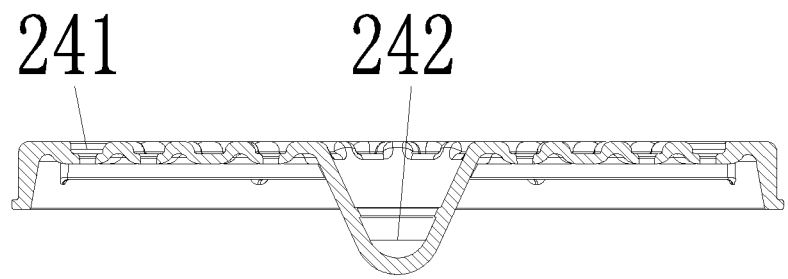
FIG. 15 is a sectional view of the top splitter in FIG. 11.

In one embodiment, a central recess portion 242 that is recessed toward the cup bottom is formed at the center of the top splitter 24, as shown in FIGS. 11, 14 and 15. In that way, with the blocking effect of the central recess portion 242, the liquid jetted from the liquid supply piercing needle 121 can be prevented from directly passing through the top through-flow hole 241 into the beverage consumable, so that the beverage consumable can be extracted fully, and the beverage obtained through extraction is mellower. To ensure that the central recess portion 242 has clearance from most kinds of liquid supply piercing needles 121 available in the market (i.e., most kinds of liquid supply piercing needles 121 available in the market don't collide with the central recess portion 242 after they pierce into the beverage capsule 2), the recess depth of the central recess portion 242 should be 2 mm-10 mm, and/or the opening diameter of the central recess portion 242 should be 1 mm-5 mm. Furthermore, the opening diameter of the central recess portion 242 is not smaller than 2 mm and not greater than 4 mm.

In one embodiment, the film tearing mechanism 14 is arranged in a way that it is driven by the capsule pressing mechanism 13 to move in the axial direction of the beverage capsule 2 in the process of movement of the capsule pressing mechanism 13 from the initial position to the pressing position, to push the capsule outward flange of the beverage capsule 2 and form a tear opening 25 on the beverage capsule 2. Of course, the film tearing mechanism 14 may move with respect to the fixed beverage capsule 2 and push the capsule outward flange in the axial direction in a variety of appropriate ways. For example, the film tearing mechanism 14 may be configured to be triggered by the capsule pressing mechanism 13 to move in the axial direction of the beverage capsule 2 in the process of movement of the capsule pressing mechanism 13 from the initial position to the pressing position, to push the capsule outward flange of the beverage capsule 2. The present disclosure is not limited to such ways. In one embodiment, the capsule pressing mechanism 13 drives the film tearing mechanism 14 to move in the axial motion of the beverage capsule 2, i.e., the capsule pressing mechanism 13 pushes the film tearing mechanism 14 to move in the axial motion of the beverage capsule 2 in the process of movement of the capsule pressing mechanism 13 from the initial position to the pressing position, and the capsule pressing mechanism 13 triggers the film tearing mechanism 14 to move in the axial direction of the beverage capsule 2, i.e., the capsule pressing mechanism 13 touches the film tearing mechanism 14 or a switch button and triggers the film tearing mechanism 14 to move in the axial direction of the beverage capsule 2 in the process of movement of the capsule pressing mechanism 13 from the initial position to the pressing position. For example, triggered by the capsule pressing mechanism 13, the film tearing mechanism 14 can be ejected in the axial direction of the beverage capsule 2 and axially push the capsule outward flange to form a tear opening 25. In one embodiment, the capsule pressing mechanism 13 drives the film tearing mechanism 14 to move in the axial direction of the beverage capsule 2. In that way, compared with embodiments that the capsule pressing mechanism 13 triggers the film tearing mechanism 14 to move in the axial direction of the beverage capsule 2, the movement of the film tearing mechanism 14 driven by the capsule pressing mechanism 13 has higher operation reliability, and the structure of the brewing device 1 is simpler. In one embodiment, the beverage capsule 2 is fixed in the capsule support 11 in the process that the film tearing mechanism 14 pushes the capsule outward flange in the axial direction.

In one embodiment, as shown in FIG. 1, the film tearing mechanism 14 comprises a sliding rack 141 slidably mounted on the capsule support 11 and a return spring 142 arranged in the axial direction of the beverage capsule 2, with two ends of the return spring connected with the capsule support 11 and the sliding rack 141 respectively, the sliding rack 141 can be driven by the capsule pressing mechanism 13 to overcome the resetting force of the return spring 142 and move in the axial direction of the beverage capsule 2, to push the capsule outward flange of the beverage capsule 2. In that way, in the process of movement of the capsule pressing mechanism 13 toward the capsule platen 12, the sliding rack 141 can be driven to overcome the resetting force of the return spring 142 to move in the axial direction of the beverage capsule 2, and the sliding rack 141 can push the capsule outward flange in the axial direction to form a tear opening 25 on the beverage capsule 2. Besides, in the process of movement of the capsule pressing mechanism 13 from the pressing position to the initial position, the sliding rack 141 can be reset under the action of the return spring 142.

Figure 5:
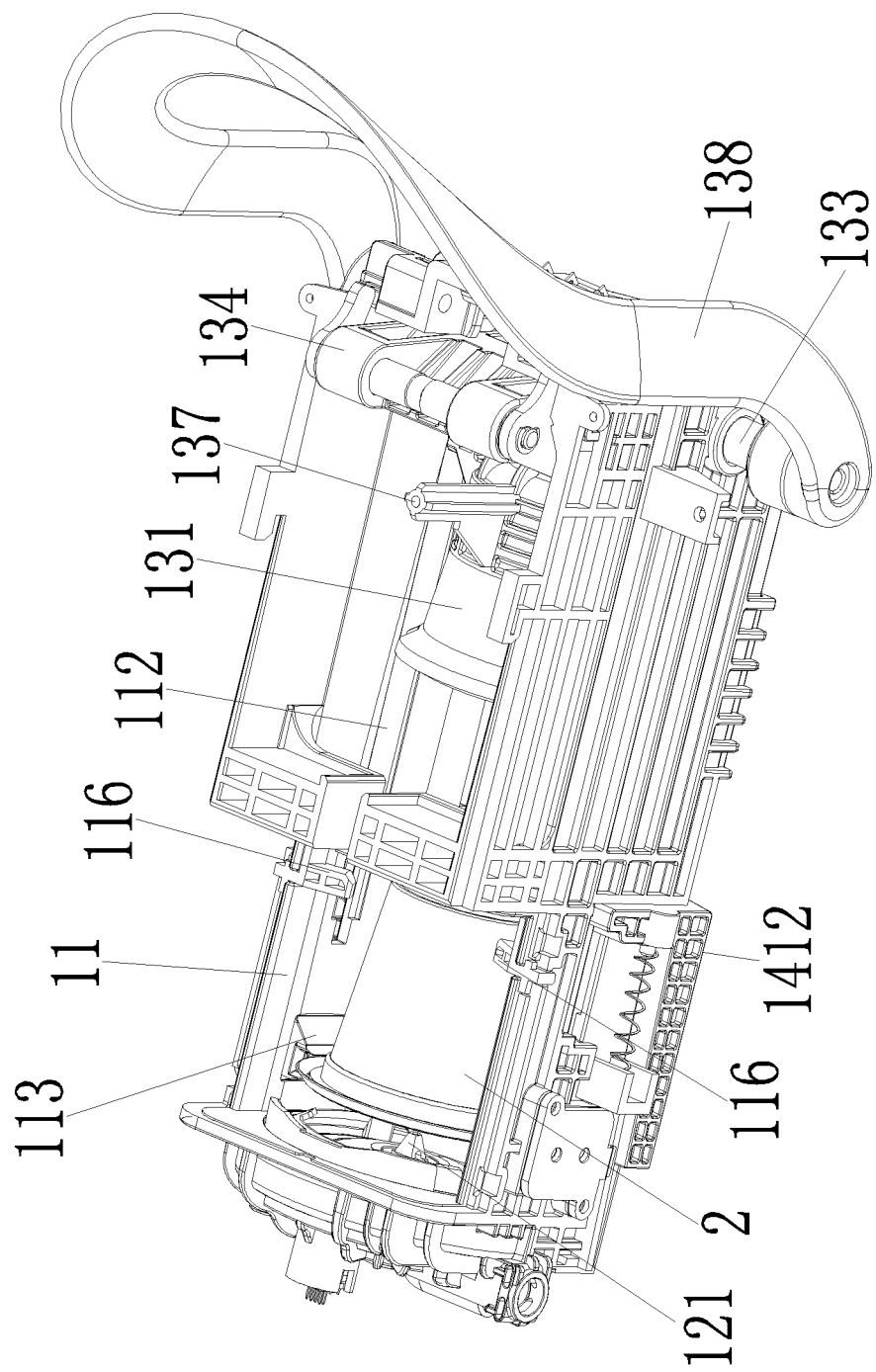
FIGS. 5 and 6 are side views of the structure shown in FIG. 1, and the capsule inlet lid is not shown.
Figure 6:
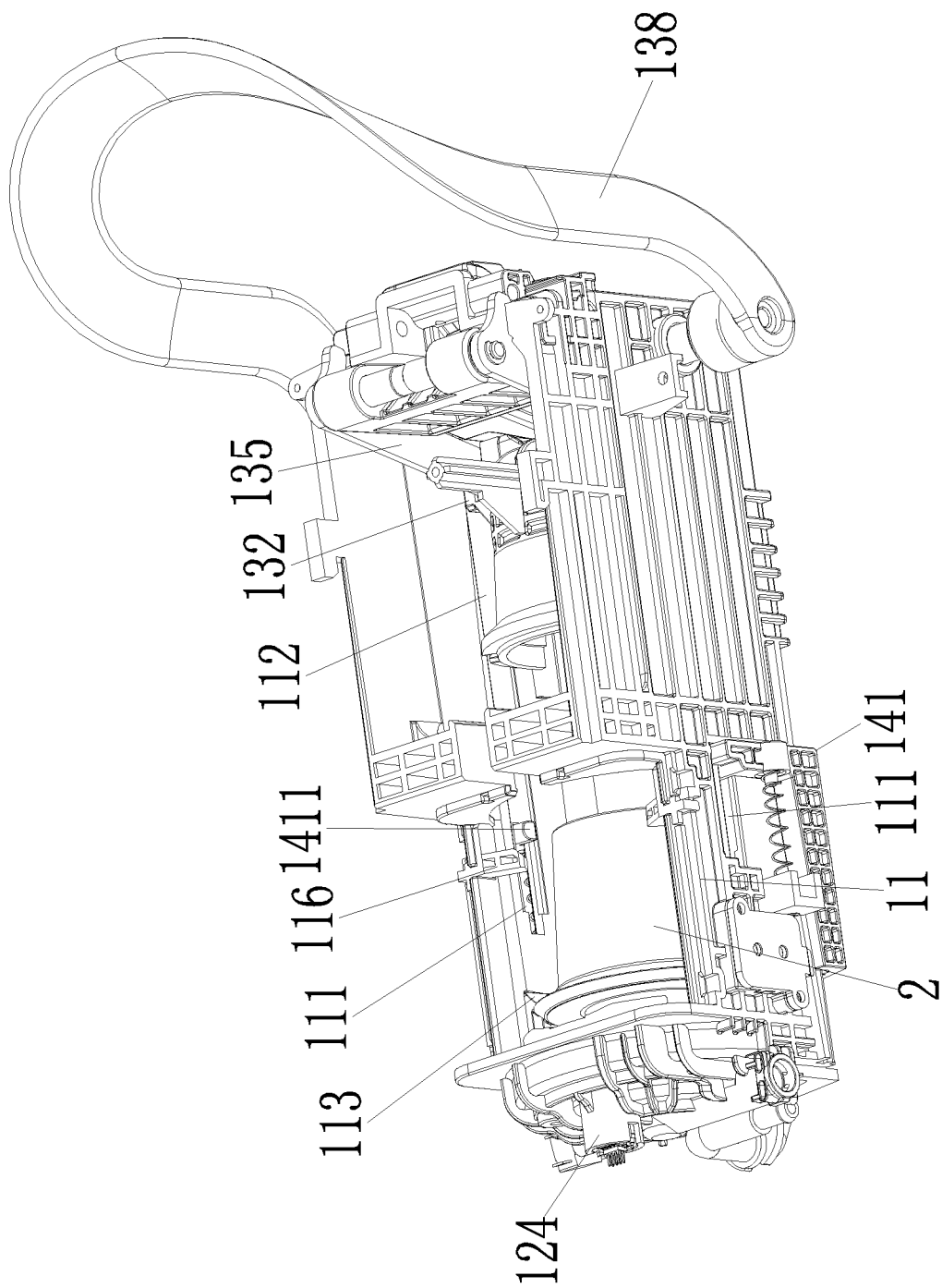

Furthermore, run-through slide channels 111 extending in the axial direction of the beverage capsule 2 are formed symmetrically on the side walls of the capsule support 11, the sliding rack 141 has sliding shafts 1411 extending into the run-through slide channels 111 and a pushing arm 1412 located at the bottom of the capsule support 11 and connected between the sliding shafts 1411, and the capsule pressing mechanism 13 pushes the sliding shafts 1411 so that the pushing arm 1412 applies pushing force to the capsule outward flange of the beverage capsule 2, as shown in FIGS. 1, 5 and 6. In that way, the sliding rack 141 can be pushed by the capsule pressing mechanism 13 smoothly, so that the sliding rack 141 pushes the capsule outward flange of the beverage capsule 2 smoothly. Thus, the reliability of the operation of the sliding rack 141 for tearing the beverage capsule 2 can be improved, and the success ratio of forming a tear opening 25 on the beverage capsule 2 by tearing with the sliding rack 141 can be improved. Of course, the sliding rack 141 and the corresponding capsule support 11 may have a variety of structures. For example, sliding channels extending in the axial direction of the beverage capsule 2 may be formed symmetrically on the inner side walls of the capsule support 11, the sliding rack 141 has sliding shafts 1411 extending into the sliding channels and a pushing arm 1412 that is located at the bottom of the capsule support 11 and connected between the sliding shafts 1411, etc. However, the present disclosure is not limited to such structures.

In one embodiment, as shown in FIGS. 1 and 8, the pushing arm 1412 is formed with an abutting groove that is configured to abut against the capsule outward flange and has an axial abutting surface 1412A connected and a radial stop surface 1412B. Thus, in the process that the capsule pressing mechanism 13 drives the sliding rack 141 to move, the capsule outward flange of the beverage capsule 2 falls into the abutting groove first, and then provides abutting and pushing force to the capsule outward flange in the axial direction under the action of the axial abutting surface 1412A, the capsule outward flange is prevented from sliding outwards further along the radial stop surface 1412B under the action of the radial stop surface 1412B, and the inner cup outward flange 211 of the inner cup 21 is driven to separate from the top edge of the circumferential wall of the outer cup 22 to form a tear opening 25. In one embodiment, the abutting groove may be in an L-shape, or hook shape (i.e., the abutting groove comprises an axial abutting surface 1412A, a radial stop surface 1412B, and a radial plane opposite to the axial abutting surface 1412A, which are connected sequentially. In addition, the radial length of the radial plane is smaller than the radial length of the axial abutting surface 1412A), or other shape.

To facilitate the film tearing mechanism 14 to tear open the inner cup outward flange 211, the axial abutting surface 1412A of the film tearing mechanism 14 should be configured in a way that it just touches the outward extension part 2111 of the inner cup outward flange 211 or just doesn't touch the outward extension part 2111, as shown in FIGS. 1, 2 and 8. Therefore, to prevent the outward extension part 2111 from sliding out of the abutting groove, the radial length of the axial abutting surface 1412A should not be smaller than 2 mm. Furthermore, by setting the radial length of the axial abutting surface 1412A to be not greater than 5 mm, the abutting groove has enough depth to tear open the inner cup outward flange 211, and has an esthetic appearance as well.

To prevent the film tearing mechanism 14 from contaminated by the beverage flowing out of the tear opening 25 from the beverage capsule 2, as shown in FIG. 2, the film tearing mechanism 14 is arranged in a way that the pushing arm 1412 is driven to move over the abutting surface of the capsule platen 12 that abuts against the beverage capsule 2 in the process of movement of the capsule pressing mechanism 13 from the initial position to the pressing position.

Figure 9:
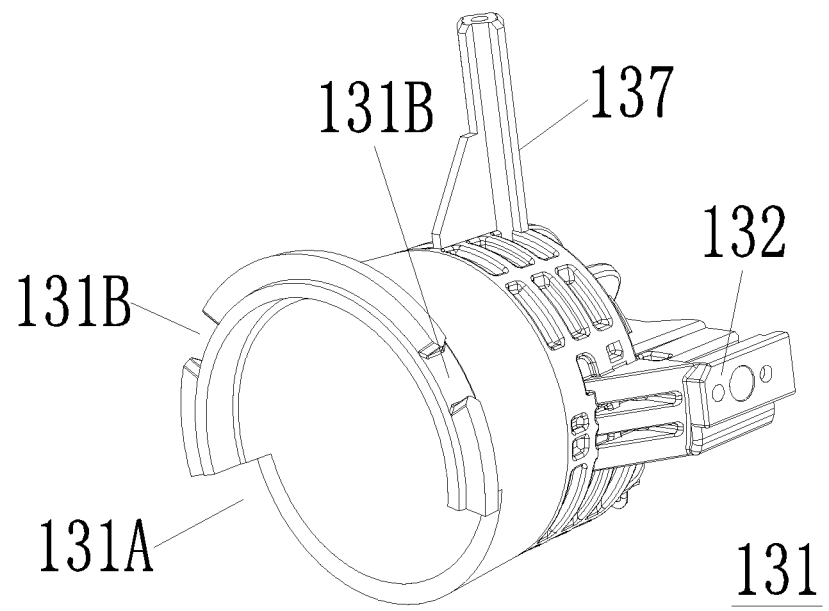
FIG. 9 is a schematic structural diagram of the capsule supporting cup in FIG. 1.

In one embodiment, the capsule pressing mechanism 13 comprises a capsule supporting cup 131 configured to press the beverage capsule 2 on the capsule platen 12, the capsule supporting cup 131 is fitted with the beverage capsule 2 and is formed with slide blocks 132 on two sides, the capsule support 11 is provided with slide rails 112 that are fitted with the slide blocks 132 to guide the capsule supporting cup 131 to move in the axial direction of the beverage capsule 2, as shown in FIGS. 5, 6 and 9. In such an arrangement, the capsule supporting cup 131 can smoothly slide in the axial direction along the slide rails 112. Furthermore, each of the slide rail 112 is provided with a run-through slide channel 111 at the axial end near the capsule platen 12, when the slide block 132 slides along the slide rail 112 to the axial end of the run-through slide channel 111 away from the capsule platen 12, the capsule supporting cup 131 can move further toward the capsule platen 12, while the slide block 132 axially abuts against and pushes the sliding shaft 1411, so that the sliding rack 141 moves toward the capsule outward flange, and the sliding rack 141 axially abut against and pushes the capsule outward flange to form a tear opening 25 on the beverage capsule 2. In one embodiment, the slide blocks 132 of the capsule supporting cup 131 abut against and push the sliding shaft 1411 of the sliding rack 141. Since it is unnecessary to additionally arrange an abutting part for abutting against and pushing the sliding shaft 1411 on the capsule supporting cup 131, the structures of the capsule supporting cup 131 and the capsule support 11 are simpler, and easier to produce and manufacture. Moreover, the capsule supporting cup 131 is fitted with the beverage capsule 2. Thus, after the beverage capsule 2 is loaded into the capsule supporting cup 131, hot liquid is charged into the beverage capsule 2 via the liquid supply piercing needle 121, the outer cup 22 of the beverage capsule 2 will expand under the heat, and the air between the capsule supporting cup 131 and the outer cup 22 can be expelled out, so that the space between the beverage capsule 2 and the capsule supporting cup 131 attains a vacuum suction state. Thus, in the resetting process of the capsule supporting cup 131 (from the pressing position to the initial position), the beverage capsule 2 can be separated from the capsule platen 12 and move together with the capsule supporting cup 131.

Furthermore, as shown in FIGS. 2 and 9, the bottom of the capsule supporting cup 131 in the cup opening area (here, the bottom is mentioned with respect to the brewing device 1) is formed with a clearance notch 131A for the liquid in the beverage capsule 2 to flow through. Of course, the bottom wall of the capsule support 11 is formed with a through-flow opening 1172 that is aligned to the clearance notch 131A. In such an arrangement, the beverage flowing out of the tear opening 25 from the beverage capsule 2 can flow through the clearance notch 131A and the through-flow opening 1172 sequentially and fall into the beverage cup of the user. That is to say, the beverage flowing out of the tear opening 25 from the beverage capsule 2 doesn't contact with any component inside the brewing device 1 before it falls into the beverage cup of the user. In that way, a situation of beverage contamination incurred by contact with the internal components of the brewing device 1 can be avoided, and the user experience can be improved.

In one embodiment, the capsule pressing mechanism 13 comprises a driving shaft 133 pivotally mounted on the capsule support 11 and a driving link rod 134 and a driven link rod 135 that are hinged between the driving shaft 133 and the capsule supporting cup 131, so that the capsule supporting cup 131 can slide along the slide rails 112 by driving the driving shaft 133 to rotate, as shown in FIGS. 5 and 6. In such an arrangement, when the driving shaft 133 is driven to rotate, the rotational kinetic energy of the driving shaft 133 can be transferred via the driving link rod 134 and the driven link rod 135 sequentially to the capsule supporting cup 131, and the capsule supporting cup 131 moves along the slide rails 112 toward or away from the capsule platen 12. In one embodiment, the driving shaft 133 may be driven to rotate by means of a motor or by the user manually. For example, the brewing device 1 comprises a handle 138 fixedly connected to the driving shaft 133, the user may drive the driving shaft 133 to rotate by pulling the handle 138. Of course, the driving shaft 133 may be driven to rotate in other ways.

Figure 7:
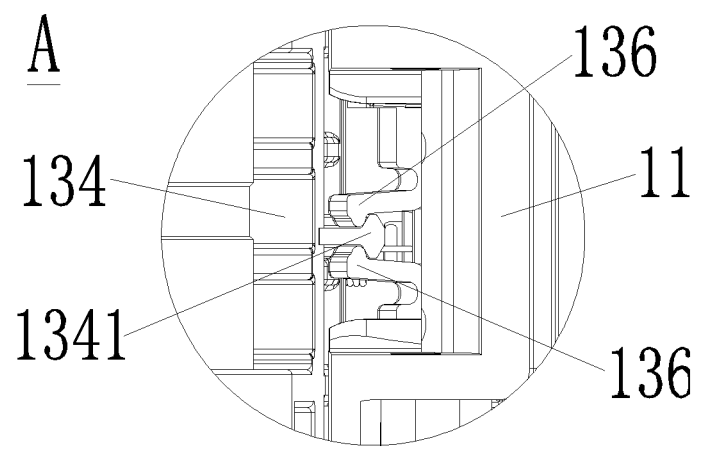
FIG. 7 is an enlarged view of the part A in FIG. 1.

In one embodiment, as shown in FIGS. 1 and 7, the driving link rod 134 is provided with a first snap-fit element 1341, the capsule support 11 is provided with a second snap-fit element 136 accordingly, the first snap-fit element 1341 can be snap-fitted with the second snap-fit element 136 and gives off a click sound when the capsule pressing mechanism 13 moves from the pressing position to the initial position. In that way, the user is provided with an audible feedback that indicates the correct snap-fitting in position, i.e., an audible feedback that indicates the capsule pressing mechanism 13 is in the initial position. Thus, the user is provided with a better user experience.

In addition, the capsule fixing mechanism comprises clamping members 113 arranged symmetrically for clamping the beverage capsule 2 and clamping springs disposed between the clamping members 113 and the capsule support 11, and the front end face and back end face of the clamping members 113 in the axial direction of the beverage capsule 2 are formed as bevel surfaces inclined with respect to the radial direction of the beverage capsule 2, so that the cup edge of the capsule supporting cup 131 can overcome the spring force of the clamping springs to drive the clamping members 113 in the radial direction by abutting against the bevel surfaces, as shown in FIGS. 5 and 6. In that way, in the process of movement of the capsule supporting cup 131 from the initial position to the pressing position, the cup edge of the capsule supporting cup 131 can abut against and push the clamping members 113 along the bevel surfaces of the rear ends of the clamping members 113 away from the capsule platen 12, so that the symmetrically arranged clamping members 113 can overcome the spring force of the clamping springs to move outwards in the radial direction, and the capsule outward flange of the beverage capsule 2 can be separated from the clamping members 113 and fall into the capsule supporting cup 131. In the process of movement of the capsule supporting cup 131 from the pressing position to the initial position, by abutting against and pushing the clamping members 113 along the bevel surfaces of the front ends near the capsule platen 12 with the cup edge of the capsule supporting cup 131, the symmetrically arranged clamping members 113 can overcome the spring force of the clamping springs to move outwards in the radial direction, to prevent the clamping members 113 from hampering the further resetting movement of the capsule supporting cup 131. Furthermore, to prevent the beverage capsule 2 from retained by the clamping members 113, the rim of the capsule supporting cup 131 should be arranged in a way that it extends beyond the rim of the capsule outward flange of the beverage capsule 2.

In one embodiment, as shown in FIG. 1, the top portion of the capsule support 11 is provided with a capsule window 114 for loading the beverage capsule 2. Thus, the user only has to place the beverage capsule 2 right above the capsule window 114 and then release the beverage capsule 2 so that the beverage capsule 2 drops freely. In that way, the beverage capsule 2 can be fixed in the capsule fixing mechanism, and the user can use and manipulate the beverage capsule 2 conveniently. In one embodiment, the capsule window 114 is located right above the capsule fixing mechanism. Besides, the top portion of the capsule support 11 is further provided with a capsule inlet lid 1151 that is slidably mounted in the axial direction of the beverage capsule 2, the outer wall of the capsule supporting cup 131 is provided with a push rod 137 that extends upwards, the capsule inlet lid 1151 can be pushed by the push rod 137 to close the capsule window 114 in the process of movement of the capsule pressing mechanism 13 from the initial position to the pressing position, as shown in FIGS. 1, 2, 5 and 6. In such an arrangement, when the capsule supporting cup 131 is in the pressing position, the capsule inlet lid 1151 can close the capsule window 114. Thus, when the beverage in the beverage capsule 2 flows out from the tear opening 25, the steam from the hot beverage will not float upwards through the capsule window 114. In addition, in the beverage brewing process, it is unable for the user (particularly with children) to insert the fingers into the brewing device 1 through the capsule window 114. Thus, the safety of use of the brewing device 1 and the beverage dispenser can be improved. Moreover, when the brewing device 1 is not used for brewage, the capsule window 114 can be closed with the capsule inlet lid 1151, to prevent dust accumulation on the components inside the brewing device 1. In addition, an inlet lid return spring 1152 is provided between the capsule support 11 and the capsule inlet lid 1151. When the capsule supporting cup 131 abuts against and pushes the capsule inlet lid 1151 to move toward the capsule platen 12, the inlet lid return spring 1152 will be elongated. When the capsule supporting cup 131 resets, the capsule inlet lid 1151 can reset under the resetting spring force of the inlet lid return spring 1152.

In one embodiment, the capsule support 11 is provided with a capsule stop block 116 configured to stop the beverage capsule 2 from moving from the pressing position to the initial position together with the capsule supporting cup 131, as shown in FIGS. 4-6 and 9, the cup edge of the capsule supporting cup 131 is formed with a stop block notch 131B that permits the capsule stop block 116 to pass through, so that the capsule supporting cup 131 can be separated from the beverage capsule 2 under the action of the capsule stop block 116 when the capsule supporting cup 131 moves from the pressing position to the initial position and the beverage capsule 2 follows the capsule supporting cup 131 in the movement. Furthermore, the bottom wall of the capsule support 11 is formed with a capsule dropping opening 1171, through which the beverage capsule 2 separated from the capsule supporting cup 131 can drop freely into a spent capsule receiving cavity of the beverage dispenser. When spent beverage capsules 2 are accumulated to a specific amount in the spent capsule receiving cavity, the user can discard them together. Thus, the user can use and operate the device conveniently. The capsule dropping opening 1171 may be arranged to be connected with the through-flow opening 1172, to facilitate production and manufacturing and simplify the structure.

Figure 10:
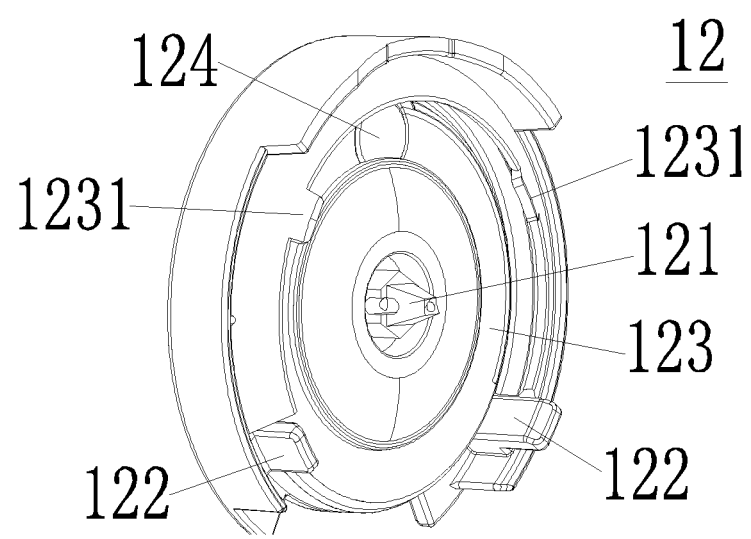
FIG. 10 is a schematic structural diagram of the capsule platen in FIG. 1.

In one embodiment, as shown in FIGS. 2 and 10, the capsule platen 12 is provided with squeezing protrusions 122 that abut against the capsule outward flange at two ends in the circumferential direction of the tear opening 25. Furthermore, the inner cup outward flange 211 located between the top edge of the circumferential wall of the outer cup 22 and the circumferential wall of the inner cup 21 is formed with a weakened structure 2113 arranged around the circumferential wall of the inner cup 21. In such an arrangement, when the sealing film 23 of the beverage capsule 2 abuts against the capsule platen 12, the squeezing protrusions 122 can abut against the capsule outward flange at the two ends in the circumferential direction of the tear opening 25; in addition, with the weakened structure 2113 arranged on the inner cup outward flange 211 between the top edge of the circumferential wall of the outer cup 22 and the circumferential wall of the inner cup 21, the circumference of the tear opening 25 at the side near the capsule platen 12 can be squeezed into an arch shape (i.e., the inner cup outward flange 211 above the tear opening 25 forms an arch shape). In that way, the tear opening 25 attains a liquid gathering effect, and the beverage in the beverage capsule 2 can flow through the tear opening 25 centrally into the beverage cup of the user, and the user experience can be improved. In one embodiment, the liquid supply piercing needle 121 may be fixedly arranged in the capsule platen 12, i.e., the liquid supply piercing needle 121 pierces through the sealing film 23 of the beverage capsule 2 and extends into the beverage capsule 2 when the beverage capsule 2 abuts against the capsule platen 12; in one embodiment, the liquid supply piercing needle 121 may be arranged in the capsule platen 12 in a way that it can extend and retract in the axial direction of the beverage capsule 2, i.e., the liquid supply piercing needle 121 is in an retracted state when the beverage capsule 2 abuts against the capsule platen 12, and the liquid supply piercing needle 121 may be driven to extend and pierce into the beverage capsule 2 when beverage is to be brewed. However, the present disclosure is not limited to those arrangements.

In one embodiment, the weakened structure 2113 may be a plurality of through-holes arranged at an interval in the circumferential direction of the inner cup outward flange 211, or may be a plurality of weakened grooves arranged at an interval in the circumferential direction of the inner cup outward flange 211, or may be a plurality of through-holes and a plurality of weakened grooves arranged at an interval in the circumferential direction of the inner cup outward flange 211, or may be a similar structure.

When the capsule pressing mechanism 13 resets, to facilitate the beverage capsule 2 to move together with the capsule pressing mechanism 13 and separate from the capsule platen 12, as shown in FIGS. 2 and 10, the capsule platen 12 is provided with an elastic seal ring 123 arranged around the liquid supply piercing needle 121, and the elastic seal ring 123 is provided with resilient protrusions 1231 extending toward the beverage capsule 2.

Figure 4:
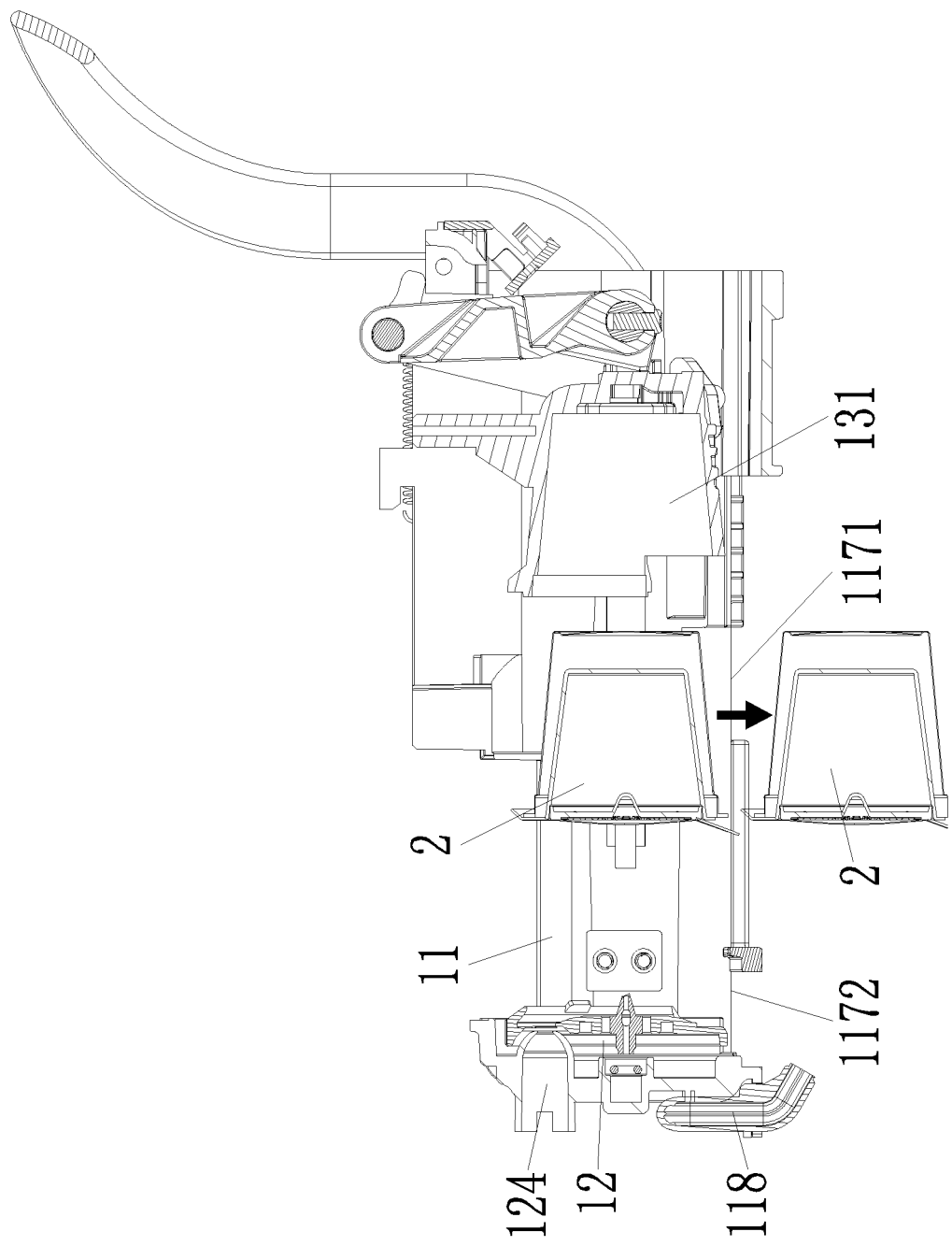

In one embodiment, the top portion of the capsule platen 12 is provided with an identification probe 124 for identifying the beverage capsule 2, as shown in FIGS. 4 and 10. Thus, for different types of beverage capsules 2, an optimal brewing program may be invoked for beverage brewing, and the brewed beverage has the best taste, and the user experience can be improved effectively. In one embodiment, the beverage dispenser comprises a controller configured to receive capsule information from the identification probe 124 and trigger a corresponding brewing program (e.g., brewing temperature and pressure, etc.) to carry out beverage brewing with the beverage capsule 2. Furthermore, by providing an identification probe 124 on the top of the capsule platen 12, the adverse effect of the steam produced by the hot liquid flowing out of the tear opening 25 on the identification probe 124 can be avoided effectively, and the identification accuracy of the identification probe 124 can be improved. To avoid the adverse effect of the tear opening 25 formed by separation of the inner cup outward flange 211 from the outer cup 22 on the identification carried out by the identification probe 124, an annular capsule identification part is arranged on the circumference of the sealing film 23.

In addition, as shown in FIGS. 2 and 4, an auxiliary tube for supplying hot water or steam is arranged on the capsule support 11, and the outlet of the auxiliary tube 118 is below the capsule platen 12. Thus, when hot water flows out of the auxiliary tube 118, hot water can be supplied to the user, and the steam produced by the hot water can attain a steam sterilization effect on the capsule platen 12 and the nearby components as well. Accordingly, when steam flows out of the auxiliary tube 118, the steam can attain a steam sterilization effect on the capsule platen 12 and the nearby components. In one embodiment, the outlet of the auxiliary tube 118 is arranged in a way that it is below the pushing arm 1412 of the film tearing mechanism 14 and can convey steam toward the pushing arm 1412 so that the auxiliary tube 118 can carry out steam sterilization for the film tearing mechanism 14 when the capsule pressing mechanism 13 is in the pressing position. Therefore, by providing an auxiliary tube 118 in the brewing device 1, bacteria proliferation can be avoided, and relevant hygienic problems of the brewing device 1 and the beverage dispenser can be reduced.

In one embodiment, the brewing device 1 further comprises a micro-switch 15 configured to sense the movement of the capsule pressing mechanism 13 to the pressing position, as shown in FIG. 1. In one embodiment, the micro-switch 15 may be triggered as a result of the touch by the capsule pressing mechanism 13 in the pressing position, or may be triggered as a result of the touch by the film tearing mechanism 14 when the capsule pressing mechanism 13 is in the pressing position, or may be triggered in other ways. In one embodiment, an audible feedback is produced when the capsule pressing mechanism 13 or the film tearing mechanism 14 touches the micro-switch 15, i.e., an audible feedback that indicates the capsule pressing mechanism 13 is in the pressing position is provided. Furthermore, once the micro-switch 15 is triggered, it provides a signal to the controller, and triggers the controller to perform corresponding operations, for example, the controller may control the identification probe 124 to identify the beverage capsule 2 or exercise control to supply liquid to the liquid supply piercing needle 121, etc., to ensure the reliability of the operation.

It should be noted that the axial direction is the axial direction of the beverage capsule 2 and the radial direction is the radial direction of the beverage capsule 2 in the brewing device 1 and the beverage capsule 2. In addition, in the brewing device 1, front, back, top and bottom are the orientations as indicated in FIGS. 2 and 4, i.e., the brewing device 1 is provided with the capsule platen 12 on its front portion, the driving shaft 133 on its back portion, the capsule inlet lid 1151 on its top portion, and the capsule dropping opening 1171 in its bottom portion.

In one embodiment, the other components and their functions of the beverage capsule 2, the brewing device 1 and the beverage dispenser according to the examples of the present disclosure are not detailed here to reduce redundancy.

While the present disclosure is described above in some embodiments, the present disclosure is not limited to those embodiments. Any modification, equivalent replacement, and improvement made without departing from the spirit and principle of the present disclosure shall be deemed as falling into the scope of protection of the present disclosure.

In addition, it should be noted that the specific features described in above specific examples may be combined in any appropriate form, provided that there is no conflict among them. To avoid unnecessary repetition, various possible combinations are not described specifically in the present disclosure.

What is claimed is:

1. A brewing device, comprising:
a capsule support provided with a capsule fixer for fixing a beverage capsule;
a capsule platen fixedly connected to the capsule support and provided with a liquid supply piercing needle for piercing into the beverage capsule;
a capsule presser configured to move linearly between an initial position and a pressing position, and to press the beverage capsule to the capsule platen in an axial direction at the pressing position; and
a film tearing mechanism, wherein the film tearing mechanism comprises a sliding rack slidably mounted on the capsule support;
wherein the beverage capsule comprises an outer cup, an inner cup and a sealing film, a top edge of the inner cup is provided with an inner cup outward flange, and the inner cup outward flange comprises an outward extension part extending to an outer side of the outer cup in a radial direction;
wherein when the beverage capsule is fixed in the brewing device, the sliding rack is configured to be driven by the capsule presser to move in the axial direction of the beverage capsule and to push the outward extension part so that the inner cup outward flange is torn open from the top edge of the circumferential wall of the outer cup, and a tear opening is formed at a cup edge between the inner cup and the outer cup.

2. The brewing device of claim 1, wherein the film tearing mechanism is configured to be driven by the capsule presser to move in the axial direction of the beverage capsule in a process of movement of the capsule presser from the initial position to the pressing position, so as to push the outward extension part of the beverage capsule.

3. The brewing device of claim 2, wherein the film tearing mechanism further comprises a return spring arranged in the axial direction of the beverage capsule, with two ends of the return spring connected with the capsule support and the sliding rack respectively, the sliding rack is configured to be driven by the capsule presser to overcome a resetting force of the return spring.

4. The brewing device of claim 3, wherein run-through slide channels extending in the axial direction of the beverage capsule are formed symmetrically on side walls of the capsule support, the sliding rack has sliding shafts extending into the run-through slide channels and a pushing arm located at the bottom of the capsule support and connected between sliding shafts, and the capsule presser pushes the sliding shafts so that the pushing arm applies pushing force to the outward extension part of the beverage capsule.

5. The brewing device of claim 4, wherein the pushing arm is formed with an abutting groove that abuts against the outward extension part and has an axial abutting surface connected and a radial stop surface.

6. The brewing device of claim 5, wherein the capsule presser comprises a capsule supporting cup configured to press the beverage capsule on the capsule platen, the bottom in a cup opening area of the capsule supporting cup is formed with a clearance notch for the liquid in the beverage capsule to flow through, the capsule supporting cup is fitted with the beverage capsule and formed with slide blocks on two sides, and the capsule support is provided with slide rails that are fitted with the slide blocks to guide the capsule supporting cup to slide in the axial direction of the beverage capsule.

7. The brewing device of claim 6, wherein the capsule presser comprises a driving shaft pivotally mounted on the capsule support and a driving link rod and a driven link rod that are hinged between the driving shaft and the capsule supporting cup, so as to drive the capsule supporting cup to slide along the slide rails by driving the driving shaft to rotate.

8. The brewing device of claim 6, wherein the capsule fixer comprises clamping members arranged symmetrically and clamping springs disposed between clamping members and the capsule support, wherein a front end face and back end face of the clamping members in the axial direction of the beverage capsule are formed as bevel surfaces inclined with respect to the radial direction of the beverage capsule, so that the cup edge of the capsule supporting cup can overcome the spring force of the clamping springs to drive the clamping members in the radial direction by abutting against the bevel surfaces.

9. The brewing device of claim 6, wherein the top portion of the capsule support is provided with a capsule window for loading the beverage capsule and a capsule inlet lid mounted slidably in the axial direction, the outer wall of the capsule supporting cup is provided with a push rod protruding outwards, and the capsule inlet lid can be pushed by the push rod to a position where it closes the capsule window in the process of movement of the capsule presser from the initial position to the pressing position.

10. The brewing device of claim 6, wherein the capsule support is provided with a capsule stop block configured to stop the beverage capsule from moving from the pressing position to the initial position together with the capsule supporting cup, the cup edge of the capsule supporting cup is formed with a stop block notch that permits the capsule stop block to pass through, so that the capsule supporting cup can be separated from the beverage capsule under an action of the capsule stop block when the capsule supporting cup moves from the pressing position to the initial position and the beverage capsule follows the capsule supporting cup in the movement.

11. The brewing device of claim 10, wherein the bottom wall of the capsule support is formed with a capsule dropping opening, through which the beverage capsule separated from the capsule supporting cup can drop freely into a spent capsule receiving cavity of a beverage dispenser.

12. The brewing device of claim 4, wherein the film tearing mechanism is arranged in a way that the pushing arm is driven to move over an abutting surface of the capsule platen that abuts against the beverage capsule in the process of movement of the capsule presser from the initial position to the pressing position.

13. The brewing device of claim 1, wherein an auxiliary tube for supplying hot water or steam is provided on the capsule support, and an outlet of the auxiliary tube is located below the capsule platen.

14. The brewing device of claim 1, wherein the top opening of the inner cup cavity is covered by the sealing film; the liquid supply piercing needle is configured to pierce through the sealing film of the beverage capsule.

15. The brewing device of claim 1, wherein the tear opening is positioned at a bottom surface of the beverage capsule when the capsule presser is positioned at the pressing position.

16. The brewing device of claim 1, wherein the circumferential wall or bottom wall of the inner cup is provided with an inner cup filter hole, and an through-flow cavity communicating with the tear opening and the inner cup filter hole is formed between the cup wall of the inner cup and the cup wall of the outer cup.

17. The brewing device of claim 1, wherein after the beverage capsule is loaded into the capsule supporting cup, hot liquid is charged into the beverage capsule via the liquid supply piercing needle, the outer cup of the beverage capsule expands under the heat, and air between the capsule supporting cup and the outer cup can be expelled out, so that the space between the beverage capsule and the capsule supporting cup attains a vacuum suction state, and in resetting movement of the capsule supporting cup from the pressing position to the initial position, the beverage capsule is configured to separate from the capsule platen and move together with the capsule supporting cup.

18. A beverage dispenser, comprising:
a brewing device, comprising:
a capsule support provided with a capsule fixer for fixing a beverage capsule;
a capsule platen fixedly connected to the capsule support and provided with a liquid supply piercing needle for piercing into the beverage capsule;
a capsule presser configured to move linearly between an initial position and a pressing position, and to press the beverage capsule to the capsule platen in an axial direction at the pressing position; and
a film tearing mechanism, wherein the film tearing mechanism comprises a sliding rack slidably mounted on the capsule support;
wherein the beverage capsule comprises an outer cup, an inner cup and a sealing film, a top edge of the inner cup is provided with an inner cup outward flange, and the inner cup outward flange comprises an outward extension part extending to an outer side of the outer cup in a radial direction;
wherein when the beverage capsule is fixed in the brewing device, the sliding rack is configured to be driven by the capsule presser to move in the axial direction of the beverage capsule and to push the outward extension part so that the inner cup outward flange is torn open from the top edge of the circumferential wall of the outer cup, and a tear opening is formed at a cup edge between the inner cup and the outer cup.

19. A brewing device, comprising:
a capsule support provided with a capsule fixer for fixing a beverage capsule;
a capsule platen fixedly connected to the capsule support and provided with a liquid supply piercing needle for piercing into the beverage capsule;
a capsule presser configured to move linearly between an initial position and a pressing position, and to press the beverage capsule to the capsule platen in an axial direction at the pressing position; and
a sliding rack slidably mounted on the capsule support;
wherein the beverage capsule comprises an outer cup, an inner cup and a sealing film, a top edge of the inner cup is provided with an inner cup outward flange, and the inner cup outward flange comprises an outward extension part extending to an outer side of the outer cup in a radial direction;
wherein when the beverage capsule is fixed in the brewing device, the sliding rack is configured to be driven by the capsule presser to move in the axial direction of the beverage capsule and to push the outward extension part so that the inner cup outward flange is torn open from the top edge of the circumferential wall of the outer cup, and a tear opening is formed at a cup edge between the inner cup and the outer cup.

20. A beverage dispenser, comprising:
a brewing device, comprising:
a capsule support provided with a capsule fixer for fixing a beverage capsule;
a capsule platen fixedly connected to the capsule support and provided with a liquid supply piercing needle for piercing into the beverage capsule;
a capsule presser configured to move linearly between an initial position and a pressing position, and to press the beverage capsule to the capsule platen in an axial direction at the pressing position; and
a sliding rack slidably mounted on the capsule support;
wherein the beverage capsule comprises an outer cup, an inner cup and a sealing film, a top edge of the inner cup is provided with an inner cup outward flange, and the inner cup outward flange comprises an outward extension part extending to an outer side of the outer cup in a radial direction;
wherein when the beverage capsule is fixed in the brewing device, the sliding rack is configured to be driven by the capsule presser to move in the axial direction of the beverage capsule and to push the outward extension part so that the inner cup outward flange is torn open from the top edge of the circumferential wall of the outer cup, and a tear opening is formed at a cup edge between the inner cup and the outer cup.

* * * * *